United States Patent
Bhorkar et al.

(10) Patent No.: US 12,418,879 B2
(45) Date of Patent: *Sep. 16, 2025

(54) GEOLOCATION OF WIRELESS NETWORK USERS

(71) Applicant: AT&T Intellectual Property I, L.P., Atlanta, GA (US)

(72) Inventors: Abhijeet Bhorkar, Fremont, CA (US); Baofeng Jiang, Pleasanton, CA (US); Peter Wong, Newark, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/732,438

(22) Filed: Jun. 3, 2024

(65) Prior Publication Data
US 2024/0323906 A1   Sep. 26, 2024

Related U.S. Application Data

(63) Continuation of application No. 17/346,179, filed on Jun. 11, 2021, now Pat. No. 12,004,114.

(51) Int. Cl.
| | |
|---|---|
| *H04W 64/00* | (2009.01) |
| *G06F 16/21* | (2019.01) |
| *G06F 16/29* | (2019.01) |
| *G06N 3/044* | (2023.01) |
| *G06N 3/045* | (2023.01) |

(Continued)

(52) U.S. Cl.
CPC ........... *H04W 64/00* (2013.01); *G06F 16/211* (2019.01); *G06F 16/29* (2019.01); *G06N 3/044* (2023.01); *G06N 3/045* (2023.01); *G06N 3/08* (2013.01); *H04W 16/22* (2013.01)

(58) Field of Classification Search
CPC .............................. H04W 64/00; H04W 72/04
USPC ...................................................... 455/456.5
See application file for complete search history.

(56) References Cited

U.S. PATENT DOCUMENTS

| 11,122,464 B2 | 9/2021 | Wong et al. |
| 2008/0242305 A1 | 10/2008 | Kahlert et al. |
| 2015/0133143 A1 | 5/2015 | Huang et al. |

(Continued)

FOREIGN PATENT DOCUMENTS

| EP | 3958008 A1 | 2/2022 |
| WO | 2016191737 A2 | 12/2016 |

(Continued)

*Primary Examiner* — Qutbuddin Ghulamali

(57) ABSTRACT

A method includes selecting a first machine learning model from a plurality of machine learning models that are trained for use in performing geolocation, wherein the first machine learning model is selected to perform geolocation within a first cell of a plurality of cells of a wireless network, acquiring event data from a plurality of wireless devices within the first cell, grouping the event data into a plurality of records, wherein each record of the plurality of records contains event data that indicates a common wireless device of the plurality of wireless devices, a common cell of the plurality of cells, and a common timestamp, and generating a predicted location of a first wireless device of the plurality of wireless devices, using the first machine learning model, wherein the first machine learning model outputs the predicted location in response to an input of a record of the plurality of records.

20 Claims, 8 Drawing Sheets

(51) Int. Cl.
    *G06N 3/08*     (2023.01)
    *H04W 16/22*     (2009.01)

(56) References Cited

U.S. PATENT DOCUMENTS

| | | | |
|---|---|---|---|
| 2017/0265189 A1* | 9/2017 | Stephenne | H04W 72/51 |
| 2018/0262903 A1* | 9/2018 | Ryan | H04W 8/22 |
| 2020/0036802 A1* | 1/2020 | Bullock | G06N 20/00 |
| 2020/0153467 A1* | 5/2020 | Ayala | H04B 17/345 |
| 2022/0022159 A1* | 1/2022 | Johansson | H04W 68/02 |
| 2022/0030607 A1* | 1/2022 | Liu | H04W 72/1273 |
| 2022/0082395 A1 | 3/2022 | Sasaki et al. | |
| 2023/0037992 A1* | 2/2023 | Zec | H04W 24/02 |
| 2023/0129682 A1* | 4/2023 | Hsu | G06N 3/08 |
| | | | 455/456.5 |

FOREIGN PATENT DOCUMENTS

| | | |
|---|---|---|
| WO | 2021181141 A1 | 9/2021 |
| WO | 2021239241 A1 | 12/2021 |

\* cited by examiner

| Cell ECGI | Model name | Throughput (predictions/ second/core) | # Historical samples | # Batch size | Latency for batching | Median error | Resource indicator |
|---|---|---|---|---|---|---|---|
| Cell 1 | Model 1 | 4,000 | 1 | 1 | - | 100m | hdfs:// |
| Cell 1 | Model 2 | 200 | 26 | 1,000 | 10 minutes | 80m | hdfs:// |
| Cell 1 | Model 2 | 20 | 26 | 1 | - | | |
| Cell 2 | Model 1 | 1,000 | 1 | 1 | - | 180m | hdfs:// |
| Cell 2 | Model 2 | 2,000 | 26 | 1,000 | - | 120m | hdfs |

| UE | ECGI | TIMESTAMP | FEATURE f1 FROM EVENT A | FEATURE f2 FROM EVENT A | FEATURE f3 FROM EVENT B | FEATURE f4 FROM EVENT B | FEATURE f5 FROM EVENT B |
|---|---|---|---|---|---|---|---|

GEOLOCATION OF WIRELESS NETWORK USERS

This application is a continuation of U.S. patent application Ser. No. 17/346,179, filed on Jun. 11, 2021, now U.S. Pat. No. 12,004,114, which is herein incorporated by referenced in its entirety.

The present disclosure relates generally to wireless networks and relates more particularly to geolocation methods, apparatuses, and non-transitory computer-readable media for predicting the locations of wireless network users in real time.

BACKGROUND

Geolocation refers to the identification of the geographic location of a user or computing device via a variety of data collection mechanisms. Geolocation techniques are often used in wireless networks to assist with capacity planning, anomaly troubleshooting, locating users during emergencies and advertising events, and the like.

SUMMARY

The present disclosure relates to a method and apparatus for predicting the locations of wireless network users in real time. In one example, a method performed by a processing system including at least one processor includes selecting a first machine learning model from among a plurality of machine learning models that are trained for use in performing geolocation, wherein the first machine learning model is selected to perform geolocation within a first cell of a plurality of cells of a wireless network, acquiring event data from a plurality of wireless devices operating within the first cell, grouping the event data into a plurality of records, wherein each record of the plurality of records contains event data that indicates a common wireless device of the plurality of wireless devices, a common cell of the plurality of cells, and a common timestamp, and generating a predicted location of a first wireless device of the plurality of wireless devices, using the first machine learning model, wherein the first machine learning model outputs the predicted location in response to an input of a record of the plurality of records.

In another example, a non-transitory computer-readable storage device stores a plurality of instructions which, when executed by a processing system including at least one processor, cause the processing system to perform operations. The operations include selecting a first machine learning model from among a plurality of machine learning models that are trained for use in performing geolocation, wherein the first machine learning model is selected to perform geolocation within a first cell of a plurality of cells of a wireless network, acquiring event data from a plurality of wireless devices operating within the first cell, grouping the event data into a plurality of records, wherein each record of the plurality of records contains event data that indicates a common wireless device of the plurality of wireless devices, a common cell of the plurality of cells, and a common timestamp, and generating a predicted location of a first wireless device of the plurality of wireless devices, using the first machine learning model, wherein the first machine learning model outputs the predicted location in response to an input of a record of the plurality of records.

In another example, an apparatus includes a processing system including at least one processor and a non-transitory computer-readable storage device storing a plurality of instructions which, when executed by the processing system, cause the processing system to perform operations. The operations include selecting a first machine learning model from among a plurality of machine learning models that are trained for use in performing geolocation, wherein the first machine learning model is selected to perform geolocation within a first cell of a plurality of cells of a wireless network, acquiring event data from a plurality of wireless devices operating within the first cell, grouping the event data into a plurality of records, wherein each record of the plurality of records contains event data that indicates a common wireless device of the plurality of wireless devices, a common cell of the plurality of cells, and a common timestamp, and generating a predicted location of a first wireless device of the plurality of wireless devices, using the first machine learning model, wherein the first machine learning model outputs the predicted location in response to an input of a record of the plurality of records.

BRIEF DESCRIPTION OF THE DRAWINGS

The teaching of the present disclosure can be readily understood by considering the following detailed description in conjunction with the accompanying drawings, in which:

FIG. 3 illustrates an example index for a repository of machine learning models;

FIG. 6 illustrates one example of a portion of a record for one set of events that is grouped according to the method of FIG. 4;

To facilitate understanding, identical reference numerals have been used, where possible, to designate identical elements that are common to the figures.

DETAILED DESCRIPTION

Figure 1:
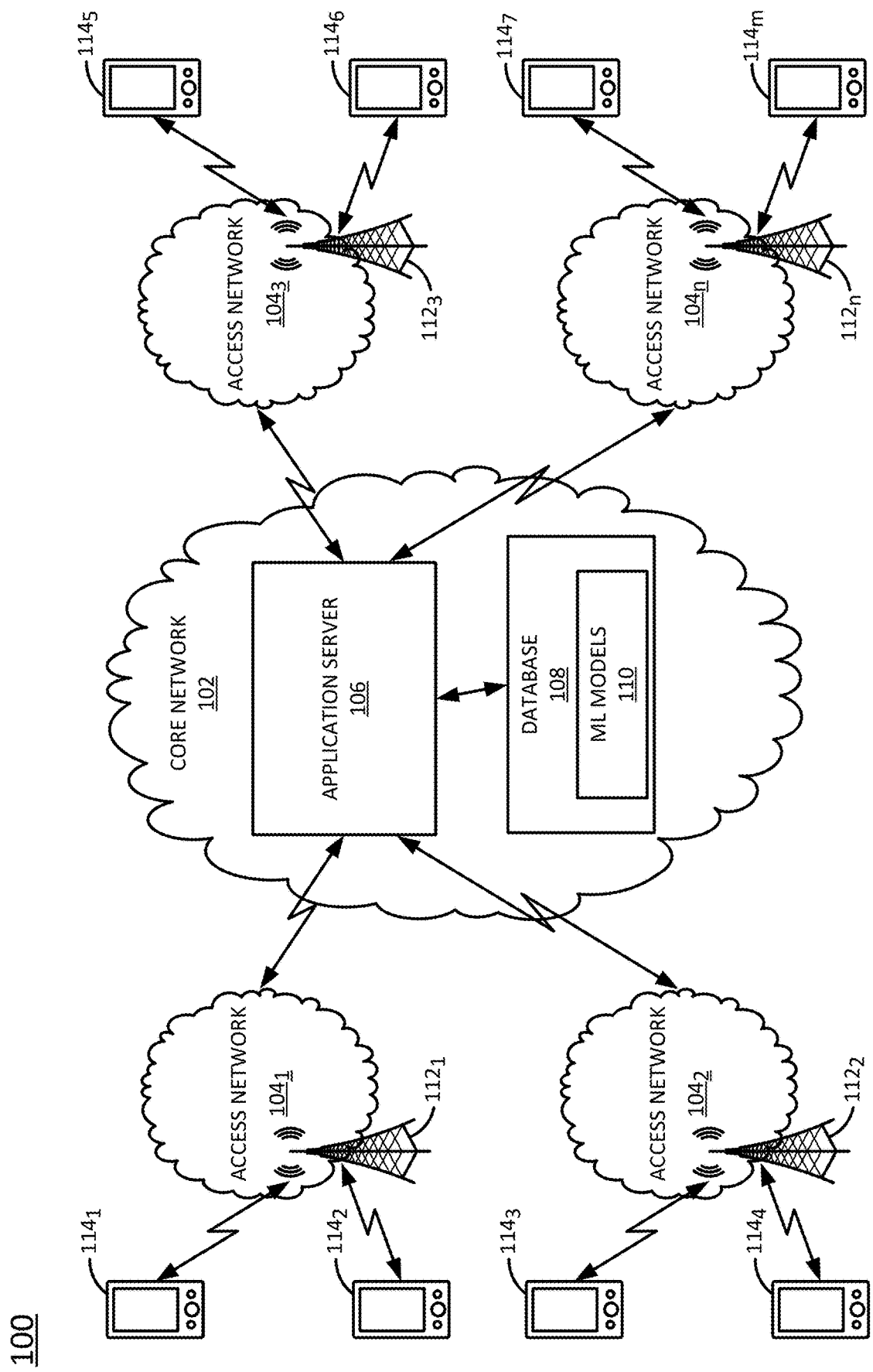
FIG. 1 illustrates an example network related to the present disclosure.

The present disclosure relates to a method and apparatus for predicting the locations of wireless network users in real time. As described above, geolocation techniques are often used in wireless (e.g., cellular) networks to assist with capacity planning, anomaly troubleshooting, locating users during emergencies and advertising events, and the like. For instance, wireless service providers can use geolocation techniques to identify coverage holes, hot spots, and capacity issues by combining user location information with wireless network measurements (e.g., signal strength, user endpoint throughput, and the like). Fast and accurate geolocation also facilitates location-sensitive services such as 911 services, Amber alerts, and other emergency services, as well as location-based targeted advertising services. Thus, real-time user endpoint geolocation can significantly enhance the experience of wireless network users.

Unfortunately, most cellular and other wireless service providers do not have access to the global positioning system (GPS) data for most (e.g., approximately ninety percent or more) of their users. For instance, the GPS may be turned off or disabled, the user may elect not to share their location data, or the GPS may be controlled by an operating system that is not controlled by the wireless service provider. Thus, alternative methods must be used to locate users.

Examples of the present disclosure predict the locations of wireless network users based on cell triangulations (e.g., for 3rd Generation (3G) cellular networks) and other key performance indicators that are uniquely available to the wireless service provider (e.g., at least signal strength and timing events). The techniques disclosed herein can scale to predict the locations of one hundred million or more wireless network users in real time. Experimental results have achieved a peak throughput of six million location predictions per second and an average throughput of 0.6 million predictions per second.

The techniques disclosed herein consider the application at issue in trading prediction accuracy for the latency of the prediction. For instance, in many applications (e.g., location-based advertising), geolocation needs to be predicted in real time with minimal latency (e.g., <one second); thus, less accurate predictions may be acceptable if the predictions can be computed relatively quickly. However, for other applications (e.g., capacity planning), the allowable latency can be on the order of days or even months; thus, waiting a longer period of time for more accurate predictions is more feasible. Examples of the present disclosure can be adjusted to provide the best possible accuracy given a set of constraints including required latency, required throughput, and/or computational constraints (e.g., amount of available processing power and/or memory). Moreover, examples of the present disclosure can be adapted for both real-time and batch predictions in the context of geolocation. These and other aspects of the present disclosure are discussed in greater detail in connection with FIGS. 1-8.

FIG. 1 illustrates an example network 100 related to the present disclosure. In one example, the network 100 may comprise a core network 102 that is communicatively coupled to one or more access networks $104_1$-$104_n$ (hereinafter individually referred to as an "access network 104" or collectively referred to as "access networks 104").

In one example, the core network 102 may combine core network components of a wired or cellular network with components of a triple play service network, where triple-play services include telephone services (e.g., wireless and/or fixed-line telephone services), Internet services, and television services to subscribers. For example, the core network 102 may functionally comprise a fixed mobile convergence (FMC) network, e.g., an Internet Protocol (IP) Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VOIP) telephony services. The core network 102 may further comprise a broadcast television network, e.g., a traditional cable provider network or an Internet Protocol Television (IPTV) network, as well as an Internet Service Provider (ISP) network. In one example, the core network 102 may include a plurality of television (TV) servers (e.g., a broadcast server, a cable head-end), a plurality of content servers, an advertising server (AS), an interactive TV/video on demand (VOD) server, and so forth (not shown). For ease of illustration, various additional elements of network 102 are omitted from FIG. 1.

In one example, the access networks 104 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3rd party networks, and/or the like. In another example, the access networks 104 may comprise radio access networks implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, the access networks 104 may comprise access networks in accordance with any "second generation" (2G), "third generation" (3G), "fourth generation" (4G), Long Term Evolution (LTE) or any other yet to be developed future wireless/cellular network technology including "fifth generation" (5G) and further generations.

For example, the operator of the core network 102 may provide a cable television service, an IPTV service, or any other types of telecommunication services to subscribers via access networks 104. In one example, the access networks 104 may comprise different types of access networks, may comprise the same type of access network, or some access networks may be the same type of access network and other may be different types of access networks. In one example, the core network 102 may be operated by a telecommunication network service provider. The core network 102 and the access networks 104 may be operated by different service providers, the same service provider, or a combination thereof, or the access networks 104 may be operated by entities having core businesses that are not related to telecommunications services, e.g., corporate, governmental, or educational institution local area networks (LANs), and the like.

In one example, each access network 104 includes at least one network element $112_1$-$112_n$ (hereinafter individually referred to as a "network element 112" or collectively referred to as "network elements 112"). The network elements 112 may comprise network elements of a cellular network (e.g., base stations, eNodeBs and the like), routers, gateway servers, and the like.

In one example, each of the access networks 104 may be in communication with one or more wireless user endpoint devices $114_1$-$114_m$ (hereinafter individually referred to as a "wireless device 114" or collectively referred to as "wireless devices 114"). The access networks 104 may transmit and receive communications between the wireless devices 114, between the wireless devices 114 and other components of the core network 102, and so forth. In one example, each of wireless devices 114 may comprise any single device or combination of fixed-location and/or mobile devices that may comprise a user endpoint device. For example, each wireless device 114 may comprise a mobile device such as a cellular smart phone, a portable gaming console, a set top box, a laptop computer, a tablet computer, a connected car, and the like. In one example, any of the wireless devices 114 may comprise a sensor device with wireless networking hardware, e.g., an Internet of Things (IoT) device, for gathering measurements of an environment, uploading the measurements to one or more servers or other devices, and so forth.

In one example, the core network 102 may include an application server 106 and a database or database server 108. The application server 106 may be communicatively coupled to the database 108 and to the network elements 112.

In one example, the database 108 may include a repository 110 storing a plurality of machine learning models, where each machine learning model of the plurality of machine learning models has been trained to output a predicted location of a wireless device 114 based on an input set of key performance indicators. In one example, the plurality of machine learning models may comprise a plurality of different types of machine learning models (e.g., recurrent neural networks, probabilistic models, and the like). Moreover, different machine learning models of the plurality of machine learning models may be trained on different combinations of key performance indicator inputs. Thus, in one example, each machine learning model that is stored in the database 108 comprises a different combination of machine learning model and combination of key performance indicators.

Figure 8:
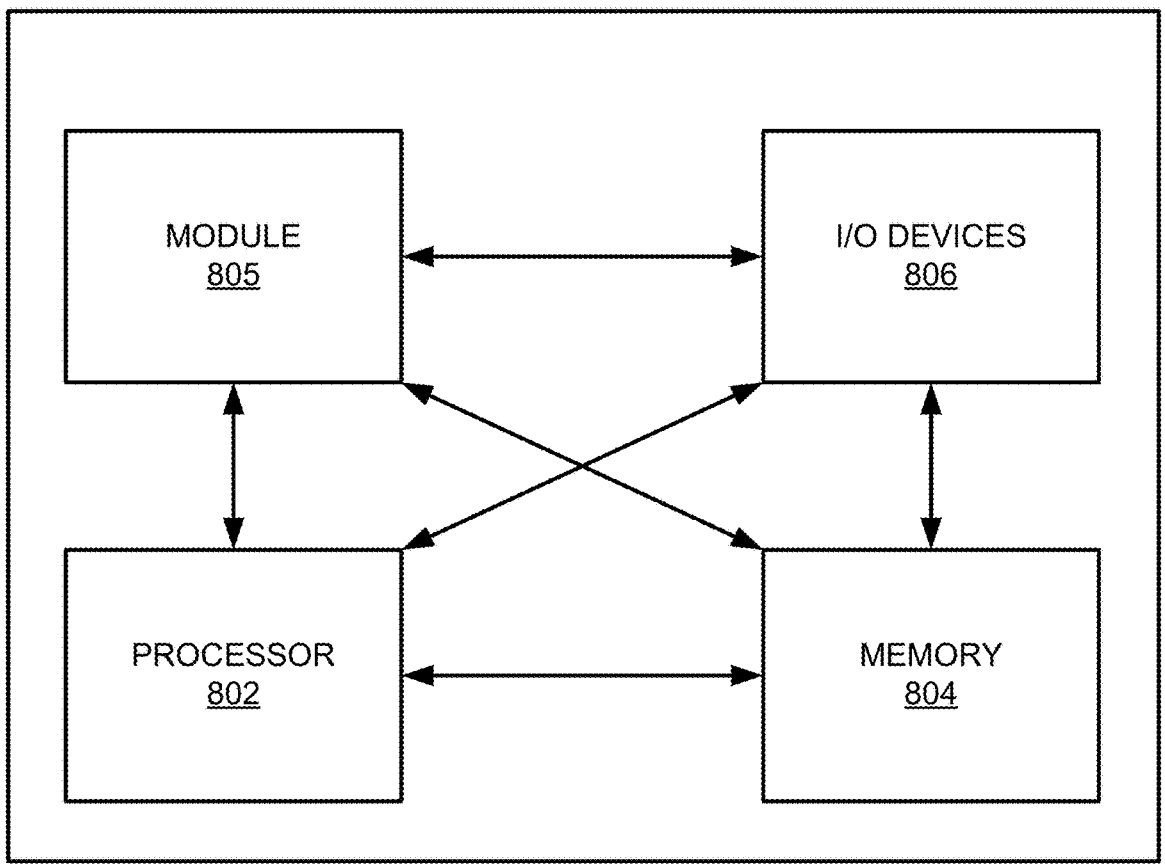
FIG. 8 depicts a high-level block diagram of a computer suitable for use in performing the functions described herein.

In one example, the application server 106 is a dedicated network hardware element configured to perform the methods and functions described herein (e.g., the methods 200, 400, and 500 discussed below). For example, the application server 106 may be deployed as a hardware device embodied as a dedicated server (e.g., the dedicated computer 800 as illustrated in FIG. 8). In other words, the application server 106 is for performing geolocation of wireless network users in accordance with the teachings of the present disclosure.

In one example, the application server 106 may be configured to predict the locations of wireless network users (e.g., wireless devices 114). More specifically, the application server 106 may retrieve a machine learning model from the database 108, where the machine learning model that is retrieved may be selected specifically to predict the locations of wireless users within a specific cell of the wireless network and/or to predict the locations of the wireless users for a specific application (e.g., network capacity planning, emergency services, or the like). The application server 106 may deploy the machine learning model and may provide as input to the machine learning model various key performance indicators collected from the wireless devices within the cell. The machine learning model may provide as output predicted locations of the wireless devices, based on analysis of the key performance indicators. One example of a method for predicting the location of a wireless device based on key performance indicators is described in greater detail in connection with FIG. 4.

Although a single application server 106 and a single database or database server 108 is shown in core network 102 of FIG. 1, various types of data may be stored in any number of databases or database servers. For instance, various databases, e.g., databases for user endpoint devices, for submarkets, for operating system versions of user endpoint devices, etc., may be deployed. In addition, various types of data may also be stored in a cloud storage. In other words, the network service provider may implement the service for performing geolocation of wireless network users of the present disclosure by storing data in a cloud storage and/or a centralized server.

It should be noted that the network 100 has been simplified. That is, the network 100 may include additional networks and/or network elements that are not illustrated in FIG. 1. For example, the access networks 104 and the core network 102 of FIG. 1 may include additional network elements such as base stations, border elements, gateways (e.g., serving gateways, packet data network gateways, etc.), firewalls, routers, switches, call control elements, mobility management entities, various application servers (e.g., home subscriber servers, feature servers, etc.), and the like.

Figure 2:
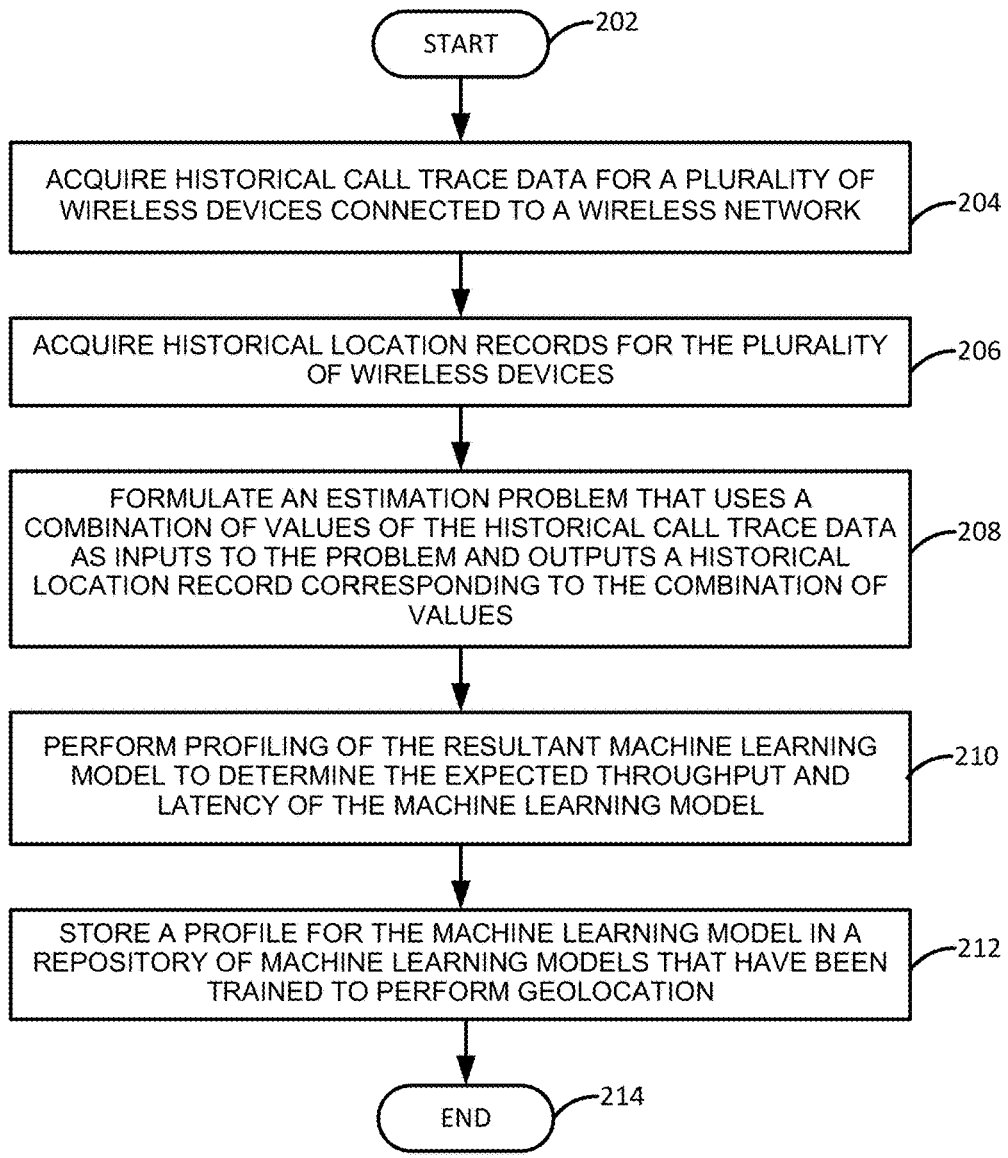
FIG. 2 illustrates a flowchart of an example method for training a machine learning model to perform geolocation of wireless network users, in accordance with the present disclosure.

FIG. 2 illustrates a flowchart of an example method 200 for training a machine learning model to perform geolocation of wireless network users, in accordance with the present disclosure. In particular, the method 200 may train a machine learning model to map selected radio key performance indicators of wireless devices (e.g., reference signal received power, timing advance, call handover/handoff, and the like) to predicted locations of the wireless devices. In one particular example, a geographical area served by a wireless network may be divided into a plurality of "cells" (e.g., radio or eNodeB cells) representing smaller sub-areas of the geographic area which are served by at least one fixed-location transceiver or base station. A classification or regression problem may then be formed to map the key performance indicators to the cells.

In one example, steps, functions and/or operations of the method 200 may be performed by a device as illustrated in FIG. 1, e.g., the application server 106 or any one or more components thereof. In one example, the steps, functions, or operations of method 200 may be performed by a computing device or system 800, and/or a processing system 802 as described in connection with FIG. 8 below. For instance, the computing device 800 may represent at least a portion of the application server 106 in accordance with the present disclosure. For illustrative purposes, the method 200 is described in greater detail below in connection with an example performed by a processing system, such as processing system 802.

The method 200 may begin in step 202. In step 204, the processing system may acquire historical call trace data for a plurality of wireless devices connected to a wireless network. In one example, the historical call trace data may be collected from one or more network elements within the wireless network and may include one or more of: timing advance (i.e., the length of time a signal takes to reach the base station from a wireless device), signal strength (e.g., reference signals received power), serving cell, neighbor cell(s), and other call trace data.

In step 206, the processing system may acquire historical location records for the plurality of wireless devices. In one example, the historical location records may be obtained from the global positioning systems of the individual wireless devices and may serve as a source of truth for pinpointing the historical locations of the wireless devices. In one example, the historical location records may identify the cells of the wireless network in which the plurality of wireless devices were present at various times.

In step 208, the processing system may formulate an estimation problem that uses a combination of values of the historical call trace data as inputs to the estimation problem and outputs a historical location record corresponding to the combination of values. In one example, the estimation problem may be formulated using a machine learning model such as a recurrent neural network with Long Short-term Memory (LSTM) units, a probabilistic model, a lookup table, and/or another type of model.

In step 210, the processing system may perform profiling of the resultant machine learning model to determine the expected throughput and latency of the machine learning model. Based on the profiling, the processing system may determine the computing resources (e.g., processing, memory, etc.) needed by the machine learning model to achieve different levels of throughput and latency.

In step 212, the processing system may store a profile for the machine learning model in a repository of machine learning models that have been trained to perform geolocation (e.g., repository 110 of FIG. 1). FIG. 3, for instance, illustrates an example index 300 for a repository of machine learning models. As illustrated, the index 300 may include a plurality of entries (e.g., rows), where each entry indicates various parameters of different machine learning models that have been trained on different combinations of key performance indicators to perform geolocation. These parameters may include, for example: the E-UTRAN cell global identifier (ECGI) or other identifier of a cell in which the machine learning model was deployed, machine learning model name, machine learning model throughput (e.g., in predictions/seconds/processing core), the number of historical samples on which the machine learning model was trained, the batch size (e.g., number of predictions made simultaneously by the machine learning model), the latency of the machine learning model for batching, the median error of the machine learning model, and a resource indicator of the machine learning model (e.g., location in the repository at which the machine learning model is stored).

In the example of FIG. 3, Model 1 may be assumed to comprise a simple probabilistic model, while Model 2 may be assumed to comprise a complex deep learning LSTM model. Model 2 may be assumed to utilize two minutes of historical data contributing to twenty-six samples.

Referring back to FIG. 2, the method 200 may end in step 214.

The method 200 may be performed to train multiple different machine learning models for each cell of a wireless network. Moreover, each machine learning model may be trained for each cell on a plurality of different combinations of historical call trace data (or key performance indicator) inputs. All machine learning models which are trained in this manner may be stored in a common repository of trained machine learning models (e.g., repository 110 of FIG. 1). A profile stored for each machine learning model in the repository may indicate the machine learning model's corresponding throughput and prediction accuracy, as discussed in connection with FIG. 3. In general, the throughput of a machine learning model may be increased by making predictions for multiple different combinations of key performance indicator values together (also referred to as "batching" predictions); however, this also requires more memory and delays the output (which increases the latency of the machine learning model). More generally, it may be assumed that, for most machine learning models, as the prediction throughput increases, the prediction accuracy decreases. Latency is generally a function of batching.

Once a machine learning model has been trained as described in FIG. 2, the machine learning model may be applied to the users of a wireless network (or, more specifically, applied to the wireless devices of the users) in order to predict the locations of those users. An ECGI-specific model (i.e., a model that is specific to the cell of the wireless network for which the predictions are to be generated) may be deployed to produce the best possible accuracy under any relevant computational constraints.

Figure 4:
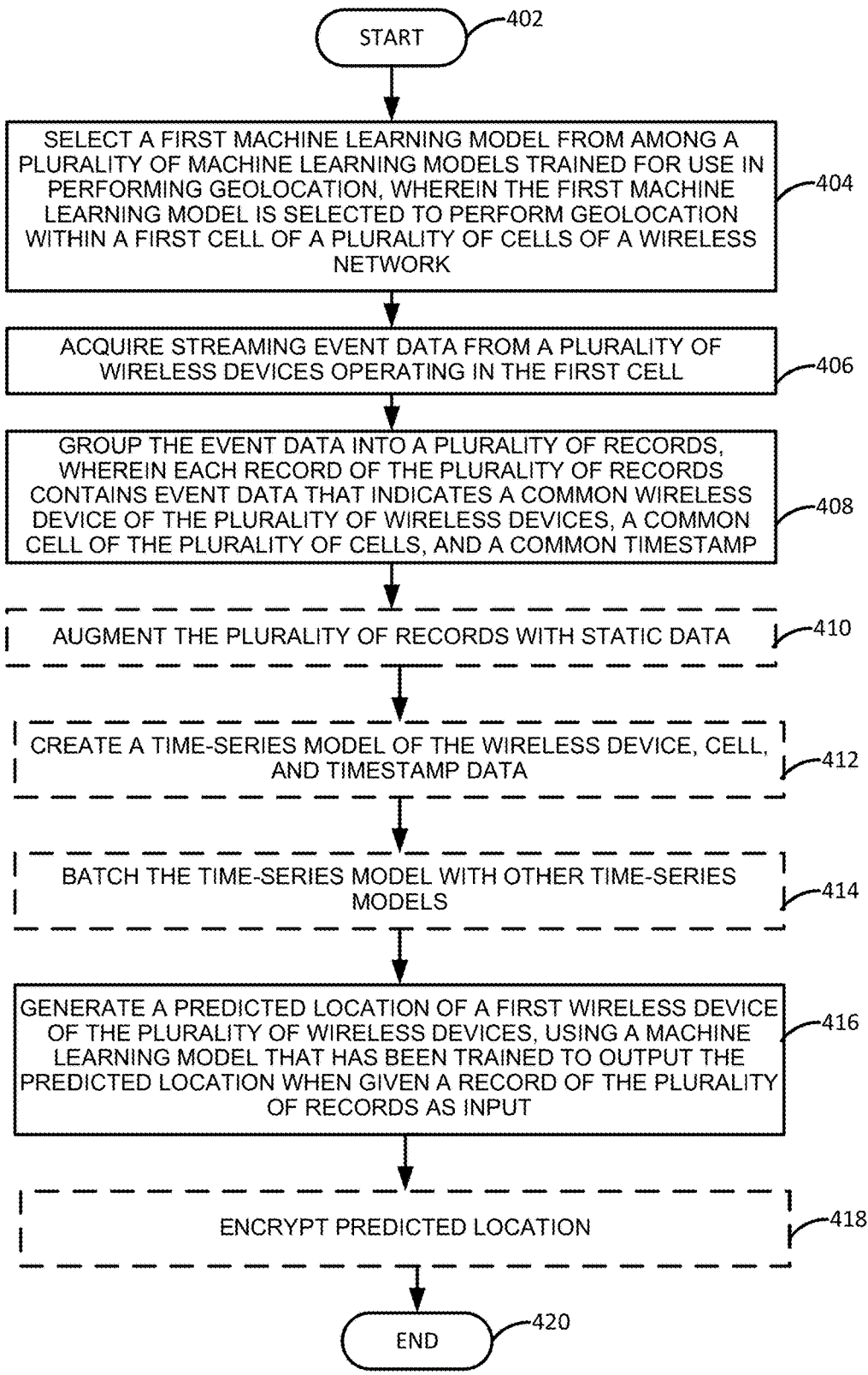
FIG. 4 illustrates a flowchart of an example method for locating wireless network users in real time, in accordance with the present disclosure.

FIG. 4 illustrates a flowchart of an example method 400 for locating wireless network users in real time, in accordance with the present disclosure. In one example, steps, functions, and/or operations of the method 400 may be performed by a device as illustrated in FIG. 1, e.g., the application server 106 or any one or more components thereof, where the device may have been trained according to the process described in FIG. 2. In one example, the steps, functions, or operations of method 400 may be performed by a computing device or system 800, and/or a processing system 802 as described in connection with FIG. 8 below. For instance, the computing device 800 may represent at least a portion of the application server 106 in accordance with the present disclosure. For illustrative purposes, the method 400 is described in greater detail below in connection with an example performed by a processing system, such as processing system 802.

The method 400 begins in step 402. In step 404, the processing system may select a first machine learning model from among a plurality of machine learning models trained for use in performing geolocation, wherein the first machine learning model is selected to perform geolocation within a first cell of a plurality of cells of a wireless network. In one example, the wireless network may comprise a plurality of cells as described above. When performing geolocation of users of the wireless network, different machine learning models may be selected to perform the geolocation for different cells of the plurality of cells. The selection of a specific machine learning model for a specific cell may be based on the desired throughput for the specific cell, the available computational resources for performing geolocation across all cells of the plurality of cells, and/or other factors. One example of a method for selecting a machine learning model for performing geolocation within a cell of a wireless network is described in greater detail in connection with FIG. 5.

In step 406, the processing system may acquire streaming event data from a plurality of wireless devices operating in the first cell. More specifically, the event data may be acquired from the eNodeBs (or other network elements) that are serving the plurality of wireless devices. In one example, the event data may comprise at least signal strength and timing events. For instance, in one example, the event data comprises one or more of: timing advance (i.e., the length of time a signal takes to reach the base station from a wireless device), signal strength (e.g., reference signals received power), serving cell, and/or neighbor cell(s).

In one example, the processing system may create a plurality of message queues into which the event data may be received, where each message queue of the plurality of message queues is configured to receive data related to a different type of event and ECGI. In another example, a single message queue may be shared by a plurality of ECGIs depending upon the last k bytes of the ECGI.

In step 408, the method 400 may group the event data into a plurality of records, wherein each record of the plurality of records contains event data that indicates a common wireless device of the plurality of wireless devices, a common cell (e.g., eNodeB) of the plurality of cells, and a common timestamp. In other words, events in the event data which correspond to the same wireless device, same cell, and same (e.g., within some predefined margin of time) timestamp may be grouped together into a single record. In one example, the processing system may group the event data by first selecting a "pivot" event. In one example, the pivot event is an event which contains a timing advance feature. Then, for each instance in the event data which corresponds to the pivot event, the wireless device, cell, and timestamp are obtained as a key. The key may then be used to sequentially correlate the wireless device, the cell, and the timestamp with other events. In one example, a fixed-size hash table may be used to store the key. The fixed size of the hash table ensures allocation of fixed blocks of memory during startup of the method 400, which helps to minimize performance bottlenecks associated with memory expansion and garbage collection during runtime.

In one example, a chain correlator may be used to group event data for multiple different events. For instance, the event data corresponding to the pivot event (e.g., a "first" event) may be read into a first data correlator of the chain, and the features of the pivot event may be extracted and written to a record. The pivot event may be associated with a first key (e.g., wireless device, cell, and timestamp) as described above. Event data for a second event may then be read into a first data mapper to extract a second key; if the second key matches the first key, then features of the second event may be extracted and written to the record by a first data correlator. Event data for a third event may then be read into a second data mapper to extract a third key; if the third key matches the first key, then features of the third event may be extracted and written to the record by a second data correlator. Where a key associated with an event does not match the first key, a NULL value may be written for the features of the corresponding event. This process may continue for any number of events, data mappers, and data correlators until the end of the chain is reached, and a final record is written. FIG. 6, for instance, illustrates one example of a portion of a record 600 for one set of events that is grouped according to step 408 of FIG. 4.

In optional step 410 (illustrated in phantom), the processing system may augment the plurality of records with static data. For instance, a feature value (fk) extracted from the event data may be replaced with other known static data from an external data source. As an example, the physical cell identity (PCI) value associated with an event in a neighbor cell may be replaced with the neighbor cell's ECGI value. In this case, a mapping from PCI value to ECGI value may be stored in an external (e.g., external to the processing system) database. In a further example, data normalization techniques such as scaling, one-hot encoding, and the like may be applied to the static data, depending on the type of feature represented by the static data.

In optional step 412 (illustrated in phantom), the processing system may create a time-series model of the wireless device, cell (e.g., ECGI), and timestamp data. In one example, the time-series model is optional and may only be needed when certain types of machine learning models (which may depend on ECGI) are selected for deployment. For instance, where the number of historical samples on which the machine learning model was trained is one, this effectively bypasses the creation of a time-series. In one example, creation of a time-series model may first involve creating a hash table with a bi-directional linked list (e.g., similar to the hash table described in connection with step 408).

Figure 7:
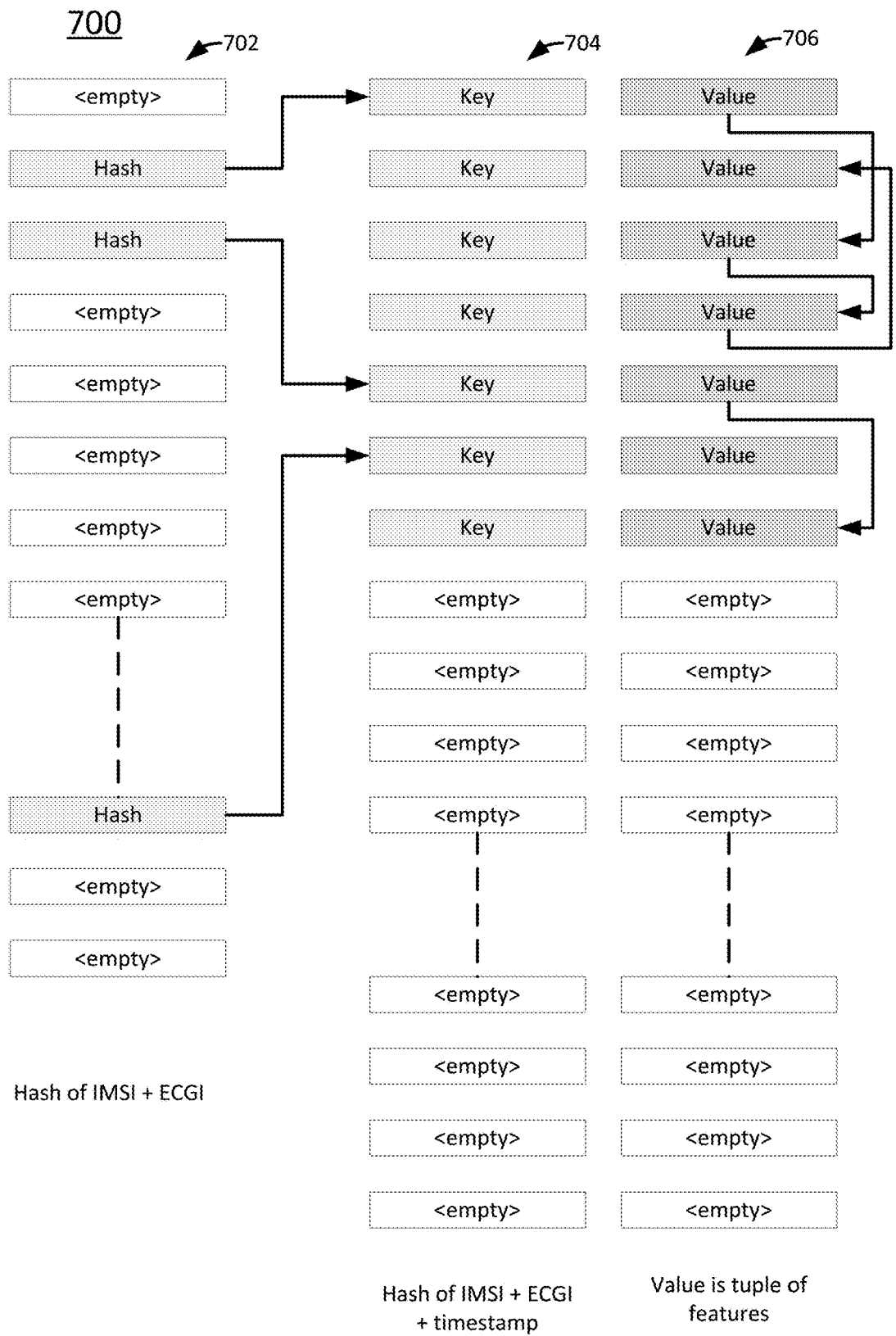
FIG. 7 illustrates one example of a hash table that may be created in accordance with the method of FIG. 4.

FIG. 7 illustrates one example of a hash table 700 that may be created in accordance with step 408 or 412 of the method 400. In particular, the hash table 700 represents an example of one type of fixed size hash table that may be used, for instance, in a data mapper as described above. A hash table of the type illustrated in FIG. 7 may be optimized for a case where the hash table maintains data over a window of time, such that older keys and event values automatically expire and are evicted from the hash table as new keys and event values are obtained.

In one example, a fixed size hash table like the hash table 700 can be created by using a fixed size hash-based array 702 as a mapping table, a fixed size key array 704, and a fixed size value array 706. The key array 704 and the value array 706 may be combined with fixed pointer tables to organize data as linked lists. A first new key/value pair may then be inserted into the first slots of the key array 704 and the value array 706, while a second new key/value pair may be inserted into the second slots of the key array 704 and the value array 706, and so on.

If there are key/value pairs that share the same hash value, a pointer to an organized linked list of other key/value pairs with the same hash value may be used. Once the key array 704 and the value array 706 are full, storage of key/value pairs may be organized so that the oldest data (e.g., oldest key/value pairs) is stored at the top of the key array 704 and value array 706, and the newest data (e.g., newest key/value pairs) is stored at the bottom of the key array 704 and the value array 706.

The next key/value pair that is acquired may be inserted into the first (e.g., bottom-most) slots of the key array 704 and the value array 706, so that the next key/value pair overwrites the oldest key/value pair. A linked list to old key/value pairs which have been overwritten may be reorganized so that key/value pairs corresponding to similar hash values remain valid.

Referring back to FIG. 4, in optional step 414 (illustrated in phantom), the processing system may batch the time-series model with other time-series models. In one example, the machine learning model that is deployed may require the batching of the time-series model. Batching may improve the throughput for complex models, as described above, but may also increase latency and memory consumption.

In step 416, the processing system may generate a predicted location of a first wireless device of the plurality of wireless devices, using a machine learning model that has been trained to output the predicted location when given a record of the plurality of records (which may optionally be modeled as a time-series and/or batched) as input. In one example, the first wireless device is one of the wireless devices for which the grouped event data has been generated.

In one example, the predicted location may be further refined by considering additional data when available, such as GPS data from the first wireless device. In this case, the predicted location may comprise a weighted combination of the GPS data and the predicted location generated by the machine learning model. The predicted location may be refined in further examples using filtering techniques, such as extended Kalman filtering, particle filtering, smoothing functions, and the like. For instance, a simple smoothing function such as an exponential average may be used.

In step 418, the processing system may optionally encrypt the predicted location (e.g., to protect the privacy of the wireless device user). In one example, any known encryption technique may be used to encrypt the predicted location.

The method 400 may end in step 420.

Figure 5:
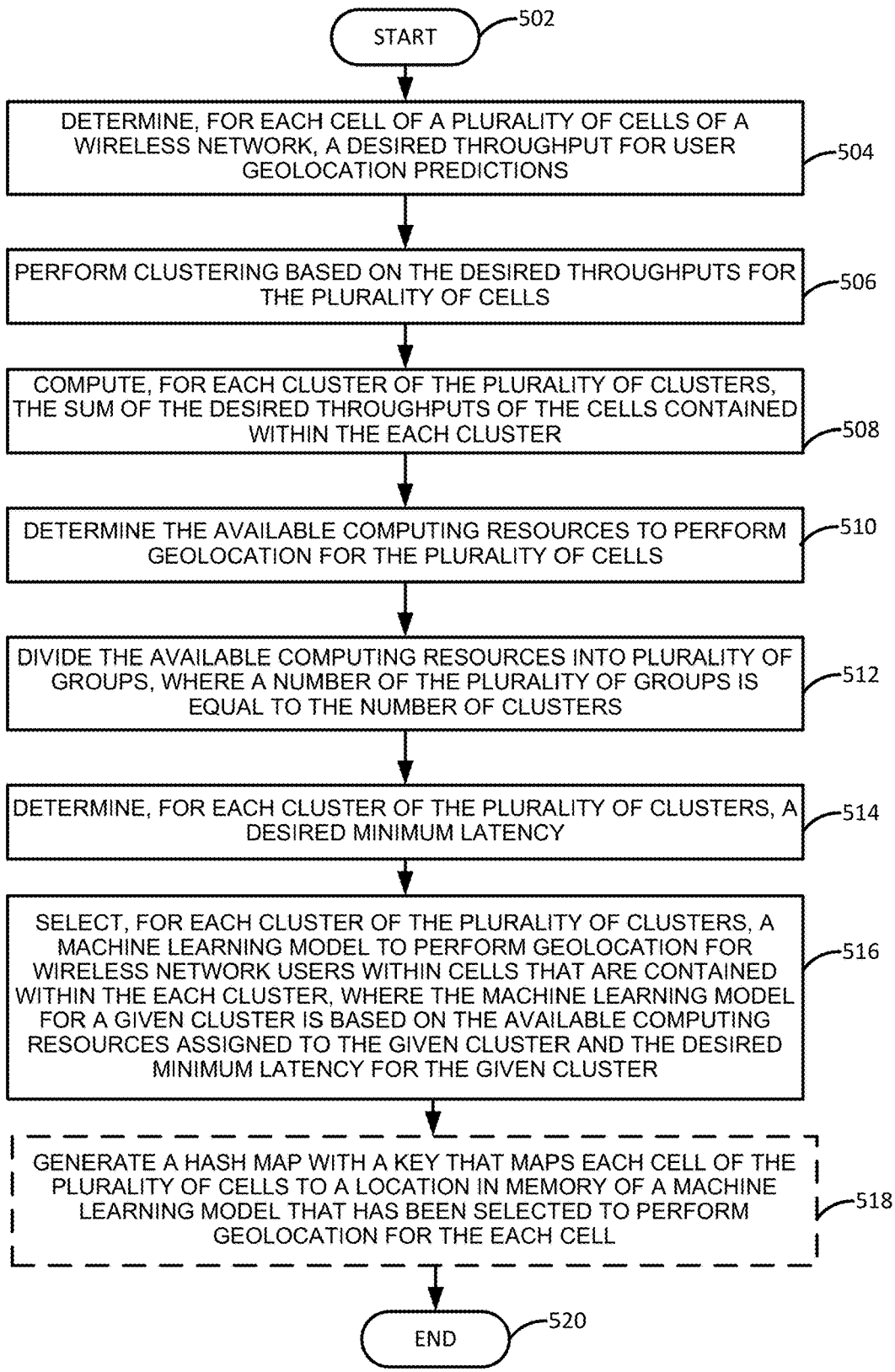
FIG. 5 illustrates a flowchart of an example method for selecting a machine learning model for performing geolocation within a cell of a wireless network, in accordance with the present disclosure.

FIG. 5 illustrates a flowchart of an example method 500 for selecting a machine learning model for performing geolocation within a cell of a wireless network, in accordance with the present disclosure. In one example, steps, functions, and/or operations of the method 500 may be performed by a device as illustrated in FIG. 1, e.g., the application server 106 or any one or more components thereof. In one example, the steps, functions, or operations of method 500 may be performed by a computing device or system 800, and/or a processing system 802 as described in connection with FIG. 8 below. For instance, the computing device 800 may represent at least a portion of the application server 106 in accordance with the present disclosure. For illustrative purposes, the method 500 is described in greater detail below in connection with an example performed by a processing system, such as processing system 802.

The method 500 begins in step 502. In step 504, the processing system may determine, for each cell of a plurality of cells of a wireless network, a desired throughput for user geolocation predictions. In one example, the plurality of cells may contain anywhere from one to N cells of the wireless network, where N is the total number of cells in the wireless network. The desired throughput may be specified by a signal from a human technician.

In one example, the desired throughput may be specified in terms of a desired number of predictions per unit of time (e.g., a desired number of geolocation predictions to be generated during each second, for a given cell). The desired throughput for a given cell may vary depending on one or more factors, including the hour of the day, the geographic location of the cell, the application for which the geolocation predictions are being generated, and/or other factors. For instance, cells that are geographically located in urban areas where there is a higher density of wireless network users may have relatively high desired throughput, while cells that are geographically located in more rural areas where there is a lower density of wireless network may have a relatively low desired throughput. Typically, the number of geolocation predictions generated per second is dependent upon the number of radio resource control (RRC) events and timing advance events received from each user endpoint device in a given cell. In one example, the desired throughput may be a desired throughput for a specific interval of time (e.g., the next one hour).

In step 506, the processing system may perform clustering based on the desired throughputs for the plurality of cells. For instance, in one example, a plurality of clusters or categories may be predefined based on levels of desired throughput. As an example, a first cluster may be defined for "high throughput" (e.g., higher than a predefined threshold), while a second cluster may be defined for "low throughput" (e.g., lower than the predefined threshold). Any one or more of a number of known clustering techniques may be used in connection with step 506, including k-means and other techniques.

In step 508, the processing system may compute, for each cluster of the plurality of clusters, the sum of the desired throughputs of the cells contained within the each cluster. For instance, a first cluster of the plurality of clusters may contain 100,000 cells whose respective desired throughputs sum to 100,000 predictions/second, while a second cluster of the plurality of clusters may contain 900,000 cells whose respective desired throughputs sum to 3,000,000 predictions/second.

In step 510, the processing system may determine the available computing resources to perform geolocation for the plurality of cells. The available computing resources may including processing resources, memory resources, and/or other types of computing resources. For instance, the processing system may determine that ten servers are available, where the ten servers collectively include 1,800 processing cores.

In step 512, the processing system may divide the available computing resources into a plurality of groups, where a number of the plurality of groups is equal to the number of clusters generated in step 506. In one example, the plurality of groups may be weighted according to the desired throughputs of the plurality of clusters (e.g., a group of computing resources assigned to a cluster having a relatively low desired throughput may be smaller or less powerful than a group of computing resources assigned to a cluster having a relatively high desired throughput).

In step 514, the processing system may determine, for each cluster of the plurality of clusters, a desired minimum latency. In one example, the desired minimum latency may be determined based on a signal from a human technician.

In step 516, the processing system may select, for each cluster of the plurality of clusters, a machine learning model to perform geolocation for wireless network users within cells that are contained within the each cluster, where the machine learning model for a given cluster is based on the available computing resources assigned to the given cluster and the desired minimum latency for the given cluster. For instance, machine learning models that cannot satisfy at least the desired minimum latency for the given cluster will not be considered for the given cluster.

In one example, a plurality of machine learning models may be available for selection, where different machine learning model of the plurality of machine learning models have been trained to predict user location based on different combinations of key performance indicators. In one example, the processing system may order the plurality of machine learning models in decreasing order according to throughput (e.g., such that the machine learning model having the highest throughput is listed first, and the machine learning model having the lowest throughput is listed last). Similarly, the processing system may order the plurality of clusters in ascending order according to desired throughput (e.g., such that the machine learning model having the lowest desired throughput is listed first, and the machine learning model having the highest desired throughput is listed last). This allows the processing system to assign the machine learning model with the highest possible throughput to each cluster of the plurality of clusters (assuming that each cluster has access to the necessary computing resources to run the machine learning model assigned to the each cluster). Since the throughput requirements of the clusters with the lower desired throughputs can be more easily satisfied, complex machine learning models may be assigned to these clusters, and then complex machine learning models may be iteratively assigned to the remaining clusters in ascending order of desired throughput.

In optional step 518 (illustrated in phantom), the processing system may generate a hash map with a key that maps each cell of the plurality of cells to a location in memory (e.g., in a repository) of a machine learning model that has been selected to perform geolocation for the each cell.

The method 500 may end in step 520. However, the method 500 may be repeated (e.g., starting from step 502) after every fixed interval (e.g., every hour) in order to ensure that relatively recent location predictions are constantly available for the wireless network users.

Although not specifically specified, one or more steps, functions or operations of method 200, 400, or 500 may include a storing, displaying, and/or outputting step as required for a particular application. In other words, any data, records, fields, and/or intermediate results discussed in the methods can be stored, displayed, and/or outputted either on the devices executing the methods or to other devices, as required for a particular application. Furthermore, steps, blocks, functions or operations in FIG. 2, 4, or 5 that recite a determining operation or involve a decision do not necessarily require that both branches of the determining operation be practiced. In other words, one of the branches of the determining operation can be deemed as an optional step. Moreover, steps, blocks, functions or operations of the above described method 200, 400, or 500 can be combined, separated, and/or performed in a different order from that described above, without departing from the example examples of the present disclosure.

FIG. 8 depicts a high-level block diagram of a computer suitable for use in performing the functions described herein. As depicted in FIG. 8, the system 800 comprises one or more hardware processor elements 802 (e.g., a central processing unit (CPU), a microprocessor, or a multi-core processor), a memory 804, e.g., random access memory (RAM) and/or read only memory (ROM), a module 805 for predicting the locations of wireless devices, and various input/output devices 806 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method 200, 400, or 500 as discussed above is implemented in a distributed or parallel manner for a particular illustrative example, i.e., the steps of the above method 200, 400, or 500, or each of the entire method 200, 400, or 500 is implemented across multiple or parallel computers, then the computer of FIG. 8 is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method.

In one example, instructions and data for the present module or process 805 for predicting the locations of wireless devices (e.g., a software program comprising computer-executable instructions) can be loaded into memory 804 and executed by hardware processor element 802 to implement the steps, functions or operations as discussed above in connection with the illustrative method 200, 400, or 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 805 for predicting the locations of wireless devices (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not a limitation. Thus, the breadth and scope of the present disclosure should not be limited by any of the above-described examples, but only in accordance with the following claims and their equivalents.

What is claimed is:

1. A method comprising:
    selecting, by a processing system including at least one processor, a machine learning model that is trained for use in performing geolocation, wherein the machine learning model is selected to perform geolocation associated with a first base station of a plurality of base stations of a wireless network;
    acquiring, by the processing system, event data from a plurality of wireless devices operating with the first base station;
    grouping, by the processing system, the event data into a plurality of records, wherein each record of the plurality of records contains event data that indicates a common wireless device of the plurality of wireless devices, a common base station of the plurality of base stations, and a common timestamp within a predefined time margin; and
    generating, by the processing system, a predicted location of a first wireless device of the plurality of wireless devices, using the machine learning model, wherein the machine learning model outputs the predicted location in response to an input of a record of the plurality of records.

2. The method of claim 1, wherein the machine learning model comprises at least one of: a recurrent neural network with Long Short-term Memory (LSTM) units, a probabilistic model, or a lookup table.

3. The method of claim 1, wherein the selecting is based at least in part on a set of computational resources available to the processing system.

4. The method of claim 1, wherein the selecting is based at least in part on a desired throughput associated with the first base station, and wherein the desired throughput indicates a desired number of predicted locations to be generated per unit of time.

5. The method of claim 1, wherein the event data comprises signal strength data for the plurality of wireless devices and timing events for the plurality of wireless devices.

6. The method of claim 5, wherein the signal strength data comprises at least one of: signal strength data of a serving cell or signal strength data of a neighbor cell.

7. The method of claim 5, wherein the timing events comprise timing advance.

8. The method of claim 1, wherein the grouping comprises:
    selecting, by the processing system, a first event from the event data to function as a pivot event;
    identifying, by the processing system, a second event which corresponds to the pivot event;
    deriving, by the processing system, a key from a wireless device of the plurality of wireless devices associated with the second event, a base station of the plurality of base stations associated with the second event, and a timestamp associated with the second event; and using, by the processing system, the key to correlate the wireless device of the plurality of wireless devices associated with the second event, the base station of the plurality of base stations associated with the second event, and the timestamp associated with the second event with other events from the event data.

9. The method of claim 8, wherein the pivot event comprises an event which contains a timing advance feature.

10. The method of claim 8, wherein the grouping is performed using a chain correlator comprising a plurality of data mappers and a plurality of data correlators.

11. The method of claim 1, wherein the generating comprises refining the predicted location with global positioning system data from the first wireless device to generate an updated predicted location.

12. The method of claim 11, wherein the updated predicted location comprises a weighted combination of the predicted location and the global positioning system data.

13. The method of claim 1, wherein the generating comprises refining the predicted location using a filtering technique.

14. The method of claim 13, wherein the filtering technique comprises at least one of: an extended Kalman filtering, a particle filtering, or a smoothing function.

15. The method of claim 1, further comprising:
augmenting, by the processing system, the plurality of records with static data from an external data source.

16. The method of claim 15, wherein the augmenting comprises replacing a value in a record of the plurality of records with a value from the static data.

17. The method of claim 1, further comprising:
creating, by the processing system, a time-series model of the plurality of records.

18. The method of claim 17, further comprising:
batching, by the processing system, the time-series model with another time-series model, prior to the generating the predicted location.

19. A non-transitory computer-readable storage device storing a plurality of instructions which, when executed by a processing system including at least one processor, cause the processing system to perform operations, the operations comprising:

selecting a machine learning model that is trained for use in performing geolocation, wherein the machine learning model is selected to perform geolocation associated with a first base station of a plurality of base stations of a wireless network;

acquiring event data from a plurality of wireless devices operating with the first base station;

grouping the event data into a plurality of records, wherein each record of the plurality of records contains event data that indicates a common wireless device of the plurality of wireless devices, a common base station of the plurality of base stations, and a common timestamp within a predefined time margin; and generating a predicted location of a first wireless device of the plurality of wireless devices, using the machine learning model, wherein the machine learning model outputs the predicted location in response to an input of a record of the plurality of records.

20. An apparatus comprising:

a processing system including at least one processor; and a non-transitory computer-readable storage device storing a plurality of instructions which, when executed by the processing system cause the processing system to perform operations, the operations comprising:

selecting a machine learning model that is trained for use in performing geolocation, wherein the machine learning model is selected to perform geolocation associated with a first base station of a plurality of base stations of a wireless network;

acquiring event data from a plurality of wireless devices operating with the first base station;

grouping the event data into a plurality of records, wherein each record of the plurality of records contains event data that indicates a common wireless device of the plurality of wireless devices, a common base station of the plurality of base stations, and a common timestamp within a predefined time margin; and generating a predicted location of a first wireless device of the plurality of wireless devices, using the machine learning model, wherein the machine learning model outputs the predicted location in response to an input of a record of the plurality of records.

* * * * *